United States Patent [19]

Butler

[11] 4,077,086
[45] Mar. 7, 1978

[54] RETRACTABLE CASTOR MECHANISM

[76] Inventor: Michael James Butler, 6524 Sepulveda Blvd., Van Nuys, Calif. 91402

[21] Appl. No.: 757,983

[22] Filed: Jan. 10, 1977

[51] Int. Cl.² .............................................. B60B 33/06
[52] U.S. Cl. ........................................... 16/33; 16/44
[58] Field of Search ................... 16/32, 33, 34, 35 R, 16/43, 44; 188/1 D

[56] References Cited
U.S. PATENT DOCUMENTS

| 1,064,244 | 6/1913 | Neugebauer | 16/33 |
| 3,121,556 | 2/1964 | Faulkner | 16/33 X |
| 3,441,974 | 5/1969 | Dean | 16/33 |

*Primary Examiner*—Dorsey Newton
*Attorney, Agent, or Firm*—Fulwider, Patton, Rieber, Lee & Utecht

[57] ABSTRACT

A retractable castor mechanism for attachment to an article of furniture or other heavy object including a castor shank that is rotatably received by a socket of a retaining member. A mainspring biases the retaining member and the castor downwardly, and a latch pin is engageable with the retaining member to latch the castor against the force of the spring in an inoperative retracted position. The latch is operated by a releasing lever having a foot portion that rests against the floor, so that a slight push of the article across the floor causes the latch pin to disengage the retaining member, allowing the castor to descend to an operative position.

11 Claims, 3 Drawing Figures

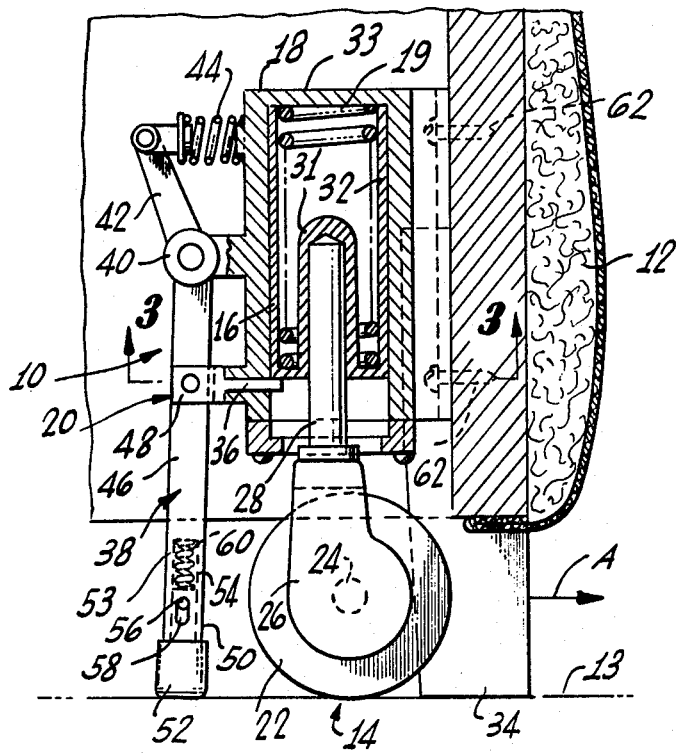
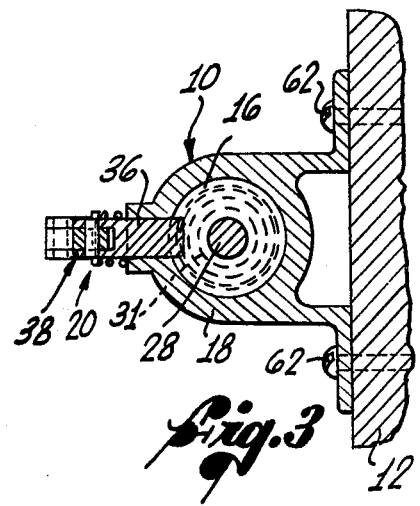
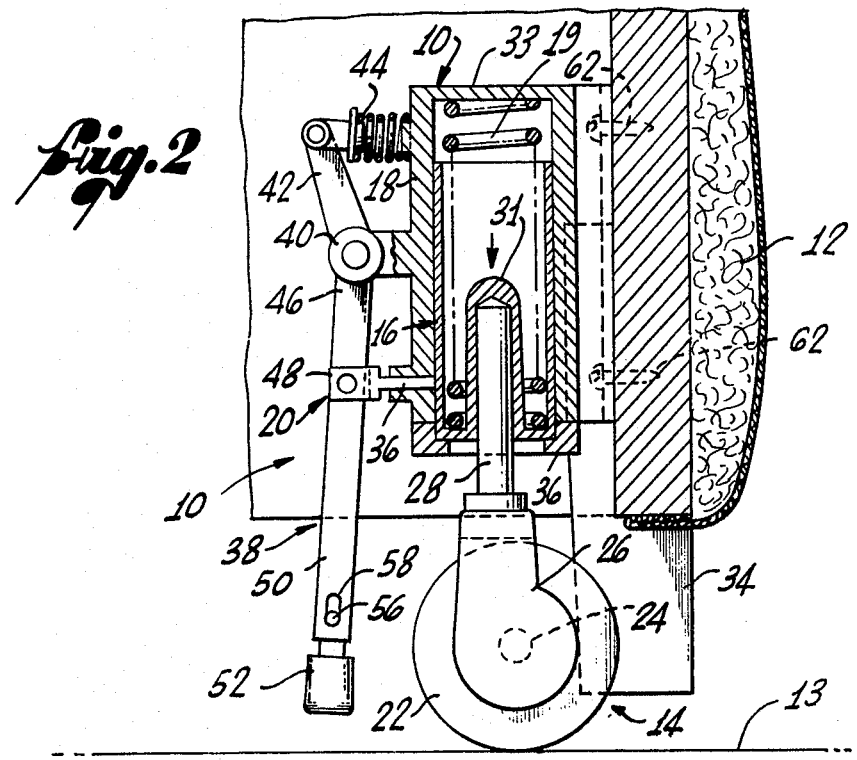

RETRACTABLE CASTOR MECHANISM

BACKGROUND OF THE INVENTION

The present invention relates to castors, and more particularly to a castor mechanism that permits a castor to be moved from an operative position to an inoperative position.

Articles of furniture and other heavy objects are often provided with castors so that they can be moved more easily. The castors do not, however, provide a base for the article that is as solid as the legs or bottom surface of the article itself. It is desirable, therefore, that the castors be made retractable to provide better support and to lower the article to its normal height when it is not being moved.

Retractable castor mechanisms that have been proposed previously are often difficult to operate. Many require that the article be lifted off the castor which is then secured in a retracted position. This arrangment is unsatisfactory because the desired to avoid lifting the article is often the reason for providing castors in the first place. Even if the article is not heavy, it is usually difficult for one person to simultaneously lift it and operate the castor mechanism. Other difficulties arise because a single person cannot operate more than one such mechanism at a time, while most articles require four or more castors for adequate support.

Some previously known castor mechanisms have included jacks by which the article can be raised and lowered, but such mechanisms are often unduly complex and difficult to use, especially in a confined area. Moreover, most previously known castor mechanisms required that the user be able to reach the mechanism to extend or retract it, and the location of the mechanism under the article and near the floor is often not conveniently accessible.

A principal object of the present invention is to provide an improved castor mechanism that can be operated conveniently by forces applied to the article on which the castor is mounted, without direct access to the castor mechanism itself.

SUMMARY OF THE INVENTION

The present invention comprises a retractable castor mechanism for attachment to items of furniture such as chairs, sofas, desks, tables and beds, and to other relatively heavy objects, such as home appliances and industrial machines. The mechanism can be latched in a retracted inoperatve position to allow the article to rest on its own legs by simply pressing downwardly on the article. It can be unlatched, so that the article is raised by a spring and rides on the castors by simply pulling the article a very short distance along the floor.

The mechanism includes a castor of conventional construction having a vertical shank that may be rotatably received by a socket in a retaining member. A mainspring engages the retaining member and biases the castor downwardly toward the bottom of a housing causing it to extend beneath the article in an operative position.

When the retaining member is moved upwardly in the housing retracting the castor into an inoperative position, a latching mechanism holds the retaining member and the castor against the force of the spring. The latching mechanism can include a latch pin that projects through the housing to engage the retaining member and a pivotable releasing lever that operates the latch pin. A latch spring biases the lever and pin toward a latching position.

The releasing lever may have a foot portion that frictionally engages the floor when the castor is retracted. In response to a slight pull of the article along the floor, the drag produced by the foot causes the lever to pivot against the force of the latch spring, and the movement of the lever withdraws the latch pin from engagement with the retaining member. The mainspring, acting through the retaining member, then returns the castor to its operative position.

Other features and advantages of the present invention will become apparent from the following detailed description, taken in conjunction with the accompanying drawings which illustrate, by way of example, the principles of the invention.

BRIEF DESCRIPTION OF THE DRAWINGS

FIG. 1 is a cross-sectional side view of a retractable castor mechanism, constructed in accordance with the invention, the cross section being taken substantially through the center of the mechanism and being partially broken away to expose a movable floor engaging tip, the mechanism being shown with the castor in its inoperative position;

FIG. 2 is a cross-sectional view similar to that of FIG. 1, showing the castor in its operative position; and FIG. 3 is a cross-sectional view of the mechanism taken sutstantially along the line 3 — 3 of FIG. 1.

DESCRIPTION OF A PREFERRED EMBODIMENT

An exemplary castor mechanism 10, embodying the present invention and shown in the accompanying drawings, is intended to be mounted on the lower portion of an article of furniture 12 or other such movable, but relatively heavy object. The mechanism 10 has an inoperative position, shown in FIG. 1, in which it permits the article 12 to rest on its own legs, and an operative position, shown in FIG. 2, in which it raises the article, permitting it to be rolled along the floor 13 on a castor 14. As in the case of non-retractable castors, more than one such castor mechanism is usually required to support the article, depending upon its configuration. In general, the mechanism 10 includes the castor 14 itself, a retaining member 16 that rotatably receives the castor, a housing 18 in which the retaining member can reciprocate, a mainspring 19 biasing the castor toward its operative position, and a latching mechanism 20 by which the castor can be held in its inoperative position.

The castor 14 is of a conventional design including a wheel 22 rotatably journaled on a horizontal axle 24 that spans the open lower end of a yoke 26. A vertical shank 28 that is offset from the axle projects upwardly from the top of the yoke. The retaining member 16 that holds the castor 14 includes an internal socket 31 in which the shank 28 is received and a concentric external sleeve 32 that slides vertically within the housing 18. To limit the downward travel of the retaining member 16, the housing 18 has a radially inwardly projecting flange 33 about its lower edge.

An annular cavity that is open at its top end is formed between the socket 31 and the sleeve 32, and the mainspring 19, in the form of a coil, is inserted in the cavity so that it presses against the 33 top of the housing 18 and the bottom of the retaining member 16. Under the bias of the mainspring 19, the castor 14 is urged toward its extended operative position, the force of the spring being sufficient to lift the leg 34 of the article 12 on which the housing 18 is mounted.

The castor 14 can be retracted to its inoperative position even with the bottom of the leg 34 and latched in that position by simply bearing down on the article 12 with sufficient force to compress the mainspring 19. To retain the castor 14 in this position, the latching mechanism 20 includes a horizontal latch pin 36 slidably received in an opening in the side of the housing 18 and movable between a latching position in which it projects inwardly from the sidewall and an unlatched position in which it does not so project. With the castor 14 in its retracted position and the pin 36 in its latch position, the pin engages the underside of the retaining member 16 (as shown in FIGS. 1 and 3 to prevent the retaining member 16 from descending within the housing 18.

The latch pin 36 is operated by a releasing lever 38 pivotally mounted on a lug 40 that projects outwardly from the side of the housing 18. The lever 38 has an upper arm 42 that is biased away from the housing 18 by a latch spring 44, and an integrally formed lower arm 46 to which the pin 36 is pivotably connected by an articulated joint 48. Whenever the retaining member is moved upwardly within the housing 18 far enough to clear the latch pin 36, the releasing lever and the pin are automatically moved by the latch spring into a latching position in which the pin prevents the retaining member 16 from moving downwardly again to return the castor 14 to its operative position.

In addition to the automatic latching feature of the invention, it is also capable of unlatching and returning the castor to its operative position without requiring that the user be able to reach the mechanism to operate it directly. To serve this purpose, the lower arm 46 of the releasing lever forms a foot portion 50 that extends downwardly beyond the latch pin 36. The lower end of the foot 50 includes a movable tip 52 having an upwardly extending projection 53 that is slidably received by an axial bore 54 in the lever 38, as shown by the broken-away portion of FIG. 1. While the projection 53 can slide axially within the lever 38, its travel is limited by a lug 56 that rides up and down in a slot 58 in the foot 50. The tip 52 is biased downwardly by a tip spring 60 contained within the upper end 53 of the bore 54. The length of the foot 50 is such that the tip 52 frictionally engages the floor 13 and is pushed upwardly against the bias of the tip spring 60 when the castor 14 is in its retracted position.

When it is desired to release the castor 14 for downward movement to its operative position under the force of the mainspring 19, the article 12 on which the castor mechanism 10 is mounted is simply pulled a short distance, about one half of an inch, along the floor 13 (in the direction of the arrow A in FIG. 1), so that the frictional engagement of the tip 52 with the floor causes the foot 50 of the lever 38 to drag behind the castor 14 as the latch spring 44 is compressed. The resulting pivotal movement of the lever 38 withdraws the latch pin 36 from the interior of the housing 18, allowing the castor 14 to descend and lift the leg 34 off the floor 13. When the article 12 is rolled about on the castor 14, the mainspring 19 acts as a suspension system so that the articles rolls more easily.

The castor mechanism 10 can be included as an original part of the article 12, or it can readily be added to a pre-existing article. In either case, the housing 18 is simply positioned on the inside surface of the leg 34 or other member so that the castor 14 is even with the bottom of the article when retracted. Wood screws 62 are then used to secure the housing 18 to the leg.

The mechanism 10 is small and compact, of simple construction, and is easily manufactured, but provides convenient movement of the castor 14 between its operative and inoperative positions by simply pressing down on the article 12 or pulling the article a short distance along the floor 13.

While a particular form of the invention has been illustrated and described, it will be apparent that various modifications can be made without departing from the spirit and scope of the invention.

I claim:

1. A retractable castor mechanism for mounting on a movable article so that the article can be rolled along a floor comprising:
   a housing;
   a retaining member slidably received by said housing for vertical reciprocation therein and including an outer sleeve and an inner socket;
   a castor having a shank inserted in said socket and movable with said retaining member between an extended operative position and a retracted inoperative position;
   a spring disposed within said sleeve and biasing said caster toward said operative position;
   latching means for latching said castor in said inoperative position against the force of said compression spring;
   said latching means including a latch pin movable into a retaining member engaging position;
   a releasing lever pivotably mounted on the outside of said housing and connected to said latch pin;
   said releasing lever having a foot portion positioned with respect to said housing to frictionally engage said floor when said castor is in said inoperative position; and
   latch spring means for urging said foot portion toward said floor and simultaneously urging said latch pin toward said socket engaging position, whereby said retaining member and said castor can be released by said latch pin to move said castor from said inoperative position to said operative position by moving said article relative to said floor.

2. The retractable castor mechanism of claim 1 wherein said foot portion includes a movable tip for frictionally engaging said floor and a tip spring engaging said lever and urging said tip against said floor.

3. A retractable castor mechanism for mounting on a movable article so that the article can be rolled along a floor comprising:
   a housing;
   a castor movable relative to said housing between an extended operative position and a retracted inoperative position;
   said castor including a shank received within said housing for substantially vertical reciprocation;
   resilient means for biasing said castor downwardly toward said operative position; and
   means for releasably latching said castor in said inoperative position against the force of said resilient means, said latching means comprising a releasing lever movable between a castor latching position and a castor unlatching position and a latch spring biasing said lever toward said castor latching position, said lever having a foot portion oriented with respect to said housing to frictionally engage said floor when said lever is in said castor latching position, whereby said lever can be moved from said castor latching position to said castor unlatching position by moving said article relative to said floor.

4. The retractable castor mechanism of claim 3, wherein:
said latching means further comprises an opening in said housing, and a latch pin connected to said lever and extending through said opening; and
said mechanism further comprises retaining means within said housing for transmitting the force of said resilient means to said castor, said retaining means being engageable by said latch pin to latch said castor in said inoperative position.

5. The retractable castor mechanism of claim 3, wherein said foot portion of said releasing lever includes a movable tip for engaging said floor and means for biasing said tip against said floor when said lever is in said latched position.

6. The retractable castor mechanism of claim 3, further comprising a retaining member including a socket in which said castor is received, said retaining member being slidably received by said housing for vertical reciprocation therein.

7. The retractable castor mechanism of claim 6, wherein said latching means furhther includes a horizontally movable latch pin connected to said lever for engaging said retaining member when said lever is in said castor latching position.

8. A retractable castor mechanism for mounting on a movable article so that the article can be rolled along a floor comprising:
a housing;
a castor movable relative to said housing between an extended operative position and a retracted inoperative position;
sais castor including a shank received within said housing for substantially vertical reciprocation;
resilient means for biasing said castor downwardly toward said operative position; and
means for releasably latching said castor in said inoperative position against the force of said resilient means, said latching means comprising a releasing lever mounted on said housing having a foot portion positioned with respect to said housing to frictionally engage said floor when said castor is in said inoperative position, said latching means releasing said castor from said inoperative position in response to movement of said releasing lever, whereby said castor can be caused to move from said inoperative position to said operative position by moving said article relative to said floor.

9. The retractable castor mechanism of claim 8, wherein said latching means further includes latch spring means connected to said housing, urging said foot portion against said floor.

10. The retractable castor mechanism of claim 8, wherein said foot portion includes a movable tip and spring means for urging said tip against said floor for frictional engagement therewith when said castor is in said inoperative position.

11. A retractable castor mechanism for mounting on a movable article so that the article can be rolled along a floor comprising:
a housing;
a castor movable relative to said housing between an extended operative position and a retracted inoperative position;
said castor including a shank received within said housing for substantially vertical reciprocation;
means for releasably latching said castor in said inoperative position against the force of said resilient means; and
a retaining member having a socket within which said shank is rotatably received for vertical reciprocation therewith, said socket being engaged by said resilient means and urged downwardly within said housing by said resilient means.

* * * * *

UNITED STATES PATENT AND TRADEMARK OFFICE
CERTIFICATE OF CORRECTION

PATENT NO. : 4,077,086
DATED : April 27, 1978
INVENTOR(S) : BUTLER, Michael James It is certified that error appears in the above-identified patent and that said Letters Patent are hereby corrected as shown below:

Column 6, after line 32 (claim 11) insert the following subparagraph:

--resilient means for biasing said castor downwardly toward said operative position;--

Signed and Sealed this

Twenty-eighth Day of November 1978

[SEAL]

Attest:

RUTH C. MASON
Attesting Officer

DONALD W. BANNER
Commissioner of Patents and Trademarks